United States Patent

[11] 3,629,616

[72] Inventor Neil Edward Walker
Tampa, Fla.

[21] Appl. No. 838,176
[22] Filed July 1, 1969
[45] Patented Dec. 21, 1971

[73] Assignee Electronic Communications, Inc.
St. Petersburg, Fla.

[54] HIGH-EFFICIENCY MODULATION CIRCUIT FOR SWITCHING-MODE AUDIO AMPLIFIER
5 Claims, 5 Drawing Figs.

[52] U.S. Cl. .......... 307/254, 330/14, 330/51, 330/146, 330/24, 307/247, 307/257
[51] Int. Cl. .......... H03k 17/00
[50] Field of Search .......... 307/242, 254, 255, 265, 261; 318/128; 328/147, 146; 330/117, 14

[56] References Cited

UNITED STATES PATENTS

| | | | |
|---|---|---|---|
| 2,844,777 | 7/1958 | Ross | 318/128 |
| 3,011,025 | 11/1961 | Sullivan | 330/117 X |
| 3,384,833 | 5/1968 | Hitt | 307/265 X |

*Primary Examiner*—Nathan Kaufman
*Attorney*—Sandoe, Hopgood and Calimafde

ABSTRACT: A circuit for efficiently coupling an amplified audio signal to a transducer is disclosed. In the form herein described, two 180° out-of-phase audio signals are respectively applied to first and second comparators which compare the audio signals with a reference signal to produce two pulse-width-modulated signals. The latter signals are applied to switching semiconductors connected in the two arms of a bridge which includes the transducer.

INVENTOR
NEIL EDWARD WALKER
BY
Sandoe, Hopgood & Calimafde
ATTORNEYS

INVENTOR
NEIL EDWARD WALKER
BY
Sandoe, Hopgood & Calimafde
ATTORNEYS

HIGH-EFFICIENCY MODULATION CIRCUIT FOR SWITCHING-MODE AUDIO AMPLIFIER

The present invention relates to a circuit for efficiently coupling an audio signal to an output utilization device such as a loudspeaker.

A basic stage of a communications receiver is the audio amplification stage which amplifies the audio signal after its detection or demodulation from the I.F. signal, and which couples that audio signal to an output transducer such as a loudspeaker. It is generally considered desirable to achieve the coupling of the audio signal with a maximum efficiency to minimize the drain on the receiver power supply. This is of particular importance in a receiver having a power supply source in the form of a battery, fuel cell, or the like, in which case reduced current drain from the voltage source increases the useful life of the voltage source. In general, an increase in the efficiency in transferring an audio signal to an output transducer, i.e., the reduction of energy losses in the receiver, results in reduced cost and increased reliability of receiver operation.

It has been proposed to employ switching techniques in the audio output stage of a receiver to increase the efficiency of the audio amplification stage. In the design of switching circuitry in this area, the design assumption is made that the output loudspeaker acts an an effective low-pass filter which rejects higher frequency signals (above the audio range) such as the free-run modulation-frequency signals (in the 100 kHz. range) of the high-frequency modulation products.

It has been found, however, that the loudspeaker impedance, even to signals at frequencies in the range of 100 kHz., is still sufficiently low, so that even when no audio signal is present there is still a significant current drain through the loudspeaker, which in turn causes energy losses and a corresponding reduction in the efficiency of the audio output stage. Although this current drain can be reduced somewhat by the use of an LC circuit tuned to the free-run frequency in series with the load, such an LC circuit, aside from being physically large, also consumes audio power because of losses in the elements. The use of an LC network, then, reduces operating efficiency because of the power it consumes. Another approach, that of raising the free-run frequency to a very high value, is not achievable at high powers because of device switching speed limitations. For these reasons, the theoretically realizable efficiency of an audio output stage utilizing switching techniques has heretofore not been achieved.

It is an object of the present invention to provide an audio signal output stage having reduced losses and thus a higher efficiency of operation than that which was heretofore obtainable in comparable audio systems.

It is a further object of the present invention to provide a circuit for coupling an audio signal to an output loudspeaker in which high-frequency, free-run losses are substantially eliminated or at least substantially reduced.

It is another object of the present invention to provide a circuit for coupling an audio signal to a loudspeaker in which no current flows through the loudspeaker when no audio signal is present.

It is yet a further object of the present invention to provide an audio signal translating and amplifying circuit having semiconductors operated in their switching modes, in which greater efficiency of circuit operation is achieved.

In the circuit of the present invention two audio frequency signals, 180° out of phase with respect to one another, are developed from the input audio signal. These signals are applied to a balanced modulator where they are compared to a common reference waveform (e.g., a sawtooth) to produce two pulse-width-modulated control signals corresponding to the relative amplitudes of the two phase-displaced signals. The latter signals are applied to a bridge, an output loudspeaker being connected across a diagonal of that bridge.

The bridge comprises, in each of its two arms, switching transistors which are respectively controlled by the two pulse-width-modulated control signals derived from the audio signal in the balanced modulator. The resulting current flow through the loudspeaker thus corresponds to the relative amplitude of the audio signal. Significantly, when the audio signal is zero, the two pulse-width-modulated control signals are substantially identical, thus balancing the bridge so that no current flows through the loudspeaker. The elimination of free-run losses through the loudspeaker appreciably reduces current drain and significantly increases the operating efficiency of the audio output stage.

As herein specifically disclosed, the balanced modulator is in the form of two differential amplifier Schmitt triggers which compare the level of the audio signal with a common sawtooth waveform. The frequency of the sawtooth is considerably higher than audio frequencies so that the audio signal may be considered as a DC level at each cycle of the sawtooth. That DC level is set to substantially one-half the overall swing of the sawtooth waveform for a zero audio signal.

Each arm of the bridge comprises first and second transistors operatively connected to one another and biased to operate in their switching modes. A constant-current source in the form of a third transistor is operatively connected to the first and second transistors and is effective to increase the speed at which the latter transistors turn on and off in response to the nature of the pulse-width-modulated control signal applied to that arm of the bridge.

To the accomplishment of the above and to such other objects as may hereinafter appear, the present invention relates to an improved circuit for efficiently coupling an audio signal to an output device, as defined in the appended claims and as described in the specification, taken together with the accompanying drawings, in which:

Figure 4B:
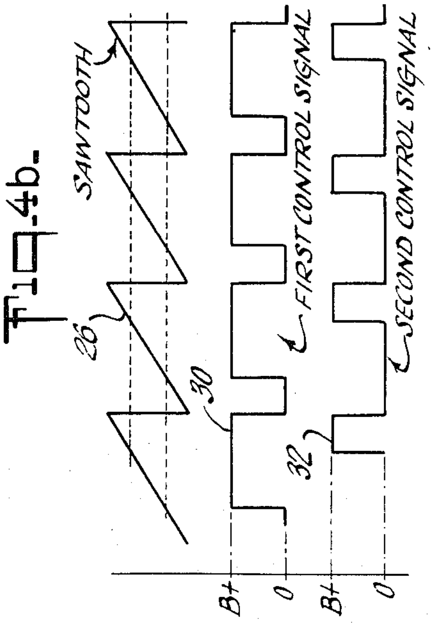
Figure 4A:
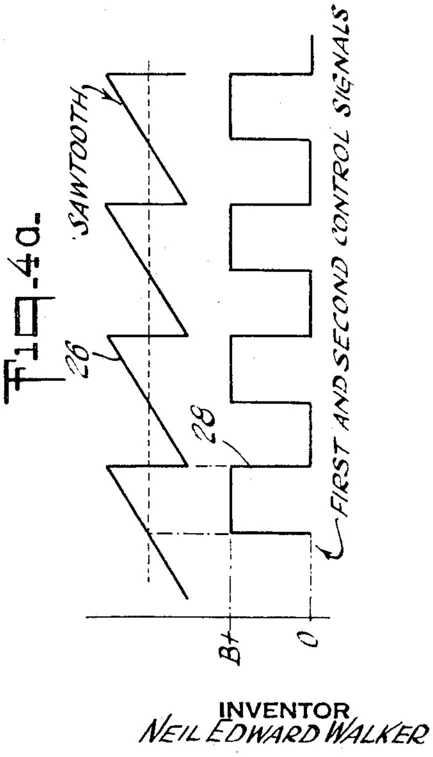

FIG. 4*a* is a waveform diagram of the reference and control signals when the audio signal is zero; and FIG. 4*b* is a waveform diagram of the reference and control signals when an audio signal is present.

Figure 1:
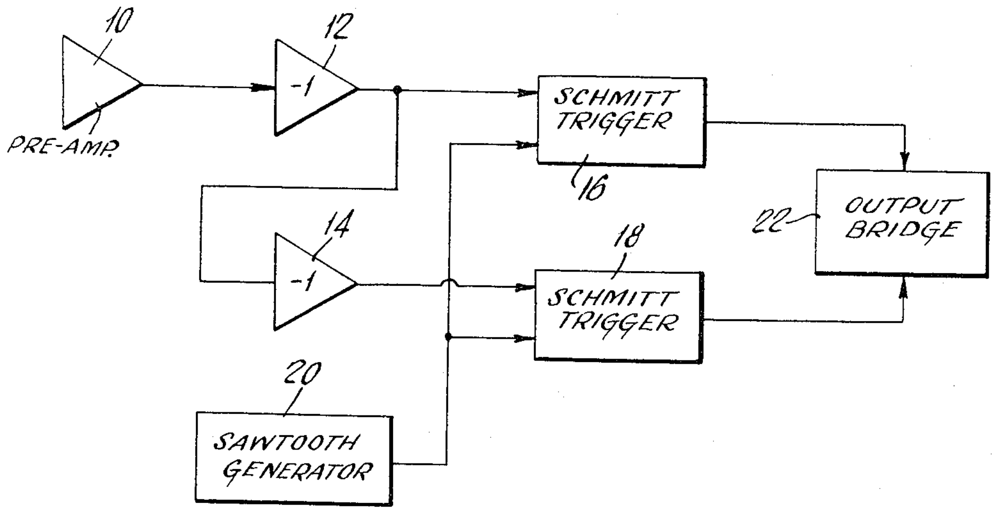
FIG. 1 is a block diagram of the audio signal coupling circuit of the present invention.

The high-efficiency audio signal coupling circuit of the invention is shown in block diagram in FIG. 1. The audio signal input to the circuit is derived from an audio preamplifier 10 and applied to a balanced pulse-width modulator to derive a pair of pulse-width-modulated control signals which are applied to an output bridge circuit which includes an output transducer connected between its two arms.

The audio signal is applied to the input of a first operational, unity-gain amplifier 12. Amplifier 12 produces a first input signal at its output, that signal being inverted (i.e., phase-shifted by 180° from the input audio signal. The said first or inverted input signal is applied to the input of a second unity-gain amplifier 14 which produces at its output a second input signal which is inverted or 180° phase-shifted with respect to the output of amplifier 12.

The first and second input signals are respectively applied to one of the inputs of a comparator circuit, here shown in the form of a pair of differential amplifier Schmitt trigger 16–18. There, the first and second input signals are simultaneously compared to a common reference waveform generated at a waveform source, here shown in the form of a sawtooth generator 20; the reference waveform is applied to another input of each of the Schmitt triggers 16–18. The frequency of the sawtooth waveform produced by generator 20 is significantly higher than the audio frequency range and may be set, for example, at 50 kHz.

Schmitt triggers 16–18 are respectively effective to compare the first and second input signals with the sawtooth waveform to produce at their outputs two control signals which are in the form of pulses whose widths correspond to the relative DC amplitudes of the audio signals as compared to the level of the sawtooth waveform. The control signals may thus be considered as being the pulse-width modulation products of the first and second audio input signals.

Figure 2:
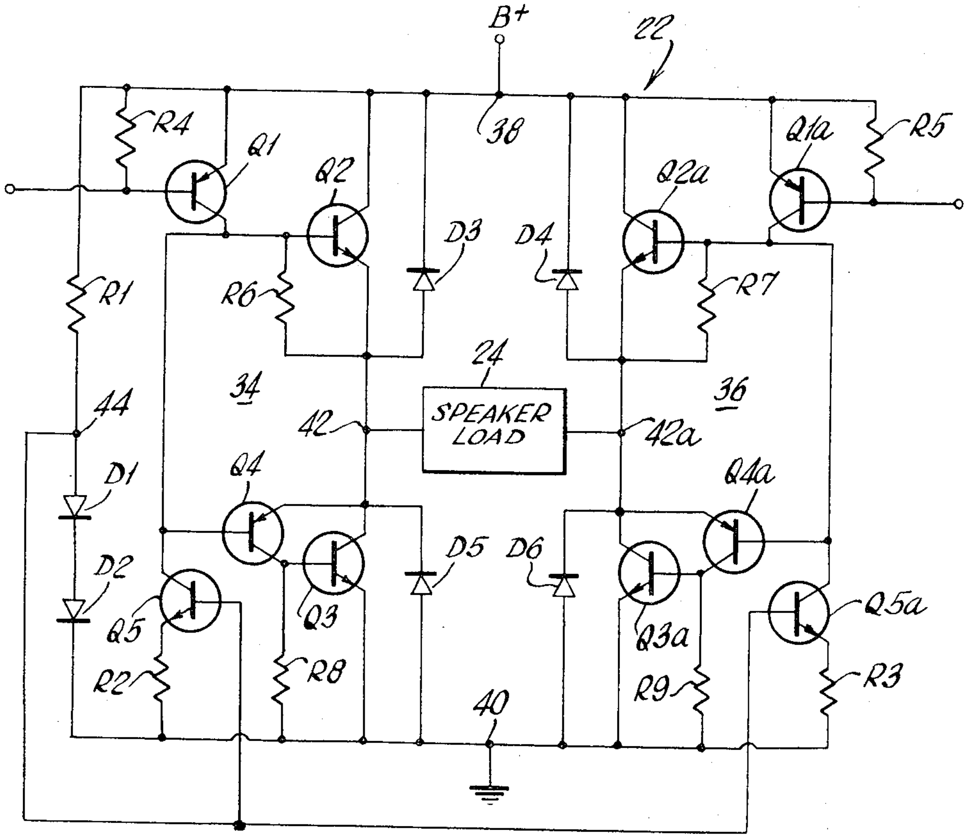
FIG. 2 is a schematic diagram of the output bridge circuit of the invention.

The two control signals are respectively applied to the two arms of a bridge 22 which includes the output transducer 24 (FIG. 2). As will be more completely described in a later part of the application, bridge 22 comprises a pair of semiconductors in each of its arms which are operated in a switching mode, i.e., they are either turned on or cut off, in response to the nature of the control signals applied thereto from the balanced modulator.

The operation of the balanced modulator to produce the pulse-width-modulated control signals may be best understood by reference to FIGS. 4*a* and 4*b*. For zero audio input, the DC level of the outputs of amplifiers 12–14, as indicated by the broken line in FIG. 4*a*, is preset to be substantially equal to one-half the peak voltage of the sawtooth waveform 26. Since the frequency of the sawtooth is much higher than that of the audio signal, the latter may be considered as a DC level for each relatively short period of the sawtooth. Schmitt triggers 16–18 thus respond to the effective DC level of the audio signal, to produce a high-level output (e.g., approximately the B+ power supply voltage) when the audio DC level is less than the level of the sawtooth waveform, or a low-level output (e.g., 0 volts) when the audio DC level is greater than the sawtooth level.

Thus, as shown in FIG. 4*a*, for a zero audio input signal, the output of both Schmitt triggers, to wit, the first and second control signals 28 are substantially identical, and are each repeating pulses having equal periods at both high and low output levels. As long as two such identical control signals are applied to the two arms of bridge circuit 22, the bridge remains balanced and there is a zero differential voltage across speaker 24; thus, in that condition, substantially no current flows through speaker 24, and efficient operation is assured when there is no audio input signal.

When an audio signal is present at the input of amplifier 12, there is a positive (or negative) input signal applied to Schmitt trigger 16 and a correspondingly negative (or positive) input signal applied to Schmitt trigger 18, as suggested by the two broken lines intercepting the sawtooth waveform in FIG. 4*b*. By comparing the negative input signal with the sawtooth waveform a first control signal 30 is produced, and by comparing the positive input signal with the same sawtooth waveform a second control signal 32 is produced. The control signals 30–32 are pulses having a repetition rate corresponding to the frequency of the sawtooth waveform, and having alternating high and low levels, the periods of which correspond to the relative amplitudes of the two phase-displaced input audio signals.

The pulse-width-modulated control signals 30–32 are applied to the arms of bridge 22. Since the two signals are negative (or positive) as the case may be for different portions of each cycle, the bridge is unbalanced. The differential voltage across and the current flow through the speaker 24 thus varies in accordance with the amplitude of the audio input signal, and such variation occurs only in the desirable circumstance of the presence of an audio input signal.

As shown in FIG. 2, bridge 22 comprises two arms, generally designated 34–36, connected between a source of B+ voltage at point 38 and ground at point 40. Since arms 34–36 are substantially identical in both design and manner of operation, only arm 34 is described herein, it being understood that that description applies equally to arm 36. Transistors in arm 36 corresponding to those in arm 34 are given the same Q designation, with the additional suffix a.

Arm 34 comprises a PNP input transistor Q1 having the conventional base, emitter and collector terminals. One of the control signals is applied to the base of transistor Q1 and its emitter-collector circuit is connected across the collector-base circuit of an NPN transistor Q2. The collector-emitter circuit of transistor Q2 is series-connected with the collector-emitter circuit of an NPN transistor Q3 between points 38–40 and define a junction point 42 therebetween. Point 42*a* is defined between the series-connected collector-emitter circuits of transistors Q2*a* and Q3*a* in arm 36. Loudspeaker 24 is connected between points 42–42*a*, being the diagonal of the bridge.

A PNP transistor Q4 has its emitter-collector circuit connected across the collector-base circuit of transistors Q3, and has its base connected to the collectors of transistor Q1 and an NPN transistor Q5. A resistor R1 is connected between point 38 and a point 44, which in turn is connected to the bases of transistors Q5–Q5*a*. A pair of series-connected diodes D1–D2 are connected between nature 44 and ground, and resistors R2–R3 are connected between the emitters of transistors Q5–Q5*a* and ground, respectively.

Resistor R1 and diodes D1–D2 establish a constant reference voltage at the bases of transistors Q5–Q5*a*. The forward voltage drop of diode D1 is substantially equal to the base-emitter voltage drops of transistors Q5 and Q5*a*, so that the voltage drop across diode D2 (which is typically approximately 0.7 volt) is developed across resistors R2 and R3 and thus between the emitters of transistors Q5 and Q5*a* and ground. This fixed voltage creates a constant current flow through resistors R2–R3, and the collectors of transistors Q5–Q5*a* therefore act as effective constant-current sinks.

Resistors R4–R5 are respectively connected between the bases of transistors Q1 and Q1*a* and point 38, resistors R6–R7 are respectively connected between the bases and emitters of transistors Q2 and Q2*a*, and resistors R8–R9 are connected respectively between the bases of transistors Q3 and Q3*a* and ground. Diodes D3–D4, respectively connected between the emitters of transistors Q2 and Q2*a* up to B+, and diodes D5–D6 connected between the collectors of transistors Q3 and Q3*a* and ground, are effective to suppress transients in the circuit.

In operation, when transistor Q1 is off, transistor Q5 attempts to draw a constant current equal to the ratio of the voltage drop across diode D2 and the resistance of resistor R2. This current is effective to supply drive to the base of transistor Q4, which in turn causes transistor Q3 to turn on. At the same time, the base of transistor Q2 is pulled low, thereby causing the latter to turn off rapidly. As a result of transistor Q3 being on and transistor Q2 being off, point 42 is pulled low toward ground.

When transistor Q1 is turned on by the presence of the control signal at its base, the base of transistor Q2 is connected to the B+ supply through the collector-emitter circuit of transistor Q1, causing transistor Q2 to turn on, with the result that the base of transistor Q4 is pulled high or positive. This in turn causes transistor Q4 to rapidly turn off, causing a similar rapid turning-off of transistor Q3. The constant current required by the constant-current transistor Q5 is now supplied by transistor Q1. Point 42 is at this time pulled toward the B+ supply level through the conducting collector-emitter circuit of transistor Q2.

Thus, diagonal points 42–42*a* are either high or low in response to the state of the input control signals applied to the bases of transistors Q1 and Q1*a*. The inductance of loudspeaker 24 causes it to filter the high-frequency switching components of the signals at points 42–42*a*, but loudspeaker 24 does utilize the lower, audio-band components of these control signals, as desired.

In the optimum operation of each arm of bridge circuit 22, one of the switching transistors Q2–Q2*a* is turning on (or off), while the other, series-connected switching transistors Q3 or Q3*a*, is turning off (or on). There is, however, a brief period during which both switching transistors are conductive so as to define a conductive path through their output circuits between the B+ supply at point 38 and ground, thereby effectively bypassing speaker 24. To reduce this loss, the time required for switching transistors Q2 and Q3 from their on to off conditions, and vice versa, should be decreased. The conventional bleeder resistors R4–R5–R6–R7–R8–R9 do, to some extent, increase the switching rate of these transistors. Significantly, in the bridge of FIG. 2, the provision of the constant-current sinks Q5–Q5$a$, operatively connected to their associated switching transistors, further increases the rates at which transistors Q2–Q2$a$–Q3–Q3$a$ switch between their conducting states. Transistors Q5–Q5$a$ essentially pull current from the bases of transistors Q2–Q2$a$, causing these transistors to turn off rapidly. Moreover, since transistors Q5–Q5$a$ draw a constant value of current, transistors Q1–Q1$a$ are able to turn on, causing transistors Q4–Q4$a$ to rapidly turn off without producing a strain on transistors Q1–Q1$a$ in supplying the current demands of transistors Q5–Q5$a$. The provision of sinks of relatively low constant currents significantly increases the switching rates of the bridge switching transistors, and thus, significantly reduces the switching losses of the circuit.

To minimize the losses in the major switching components, to wit, transistors Q2–Q2$a$–Q3–Q3$a$, they should theoretically be driven to complete saturation, which would typically produce a collector-emitter voltage drop of 1 volt at high levels of collector current. However, to achieve this, the upper bridge switching transistors, Q2–Q2$a$, would have to be of the PNP type rather than the NPN type shown in FIG. 2. PNP transistors are, however, more expensive than NPN transistors having comparable switching speeds. Moreover, these switching transistors would have to be driven by a base current having a magnitude in the order of one-tenth of the collector load current to insure that it will operate at saturation. This base drive may be considered as being a loss to the surrounding bridge circuitry and may be considerable. To illustrate this point, for a conventional switching-transistor configuration, it may be assumed that there are no losses except for the series loss and the base-drive loss. For a 28-volt supply, a 2-ohm load, and a collector-emitter voltage of 1 volt, the value of the base-drive current not supplied to the load and thus lost to the surrounding circuitry is approximately 1.3 amperes, and the maximum efficiency E of the circuit would be:

$$E=\frac{\text{Power In}}{\text{Power Out}}=\frac{\frac{(28-2)^2}{2}}{\left[\frac{(28-2)}{2}+1.3\right]28}=84.3\%$$

However, in the improved bridge circuit of FIG. 2 the control elements of drive transistors Q1–Q1$a$–Q4–Q4$a$are connected across the base-collector terminals of their respective associated switching transistors Q2–Q2$a$–Q3–Q3$a$. The voltage loss is no longer 1 volt, but becomes the base-emitter voltage of the particular switching transistor plus the collector-emitter voltage of the particular drive transistor, i.e., typically approximately 1.5 volts. However, most of the base-drive current is now coupled through loudspeaker 24, so that the base-drive current becomes only approximately 0.125 amperes, a reduction to approximately one-tenth of the base drive lost to the surrounding circuitry of the conventional circuit. Since power varies with the square of the current, the surrounding circuit loss is thus approximately proportional to one-hundredth of the load current, and the maximum efficiency of the circuit of FIG. 2 is:

$$E=\frac{\frac{(28-3)^2}{2}}{\left[\frac{(28-3)}{2}+0.125\right]28}=88.4\%$$

This represents a significant increase in efficiency as compared to that obtained without the provision of the drive transistors (Q1–Q1$a$–Q4–Q4$a$) connected across the switching transistors (Q2–Q2$a$–Q3–Q3$a$) as in the conventional switching transistor arrangement described in the immediately preceding analysis. This improvement in efficiency is largely a result of the reducing the base-drive current (in the switching resistors) transferred to the load (loudspeaker 24).

Figure 3:
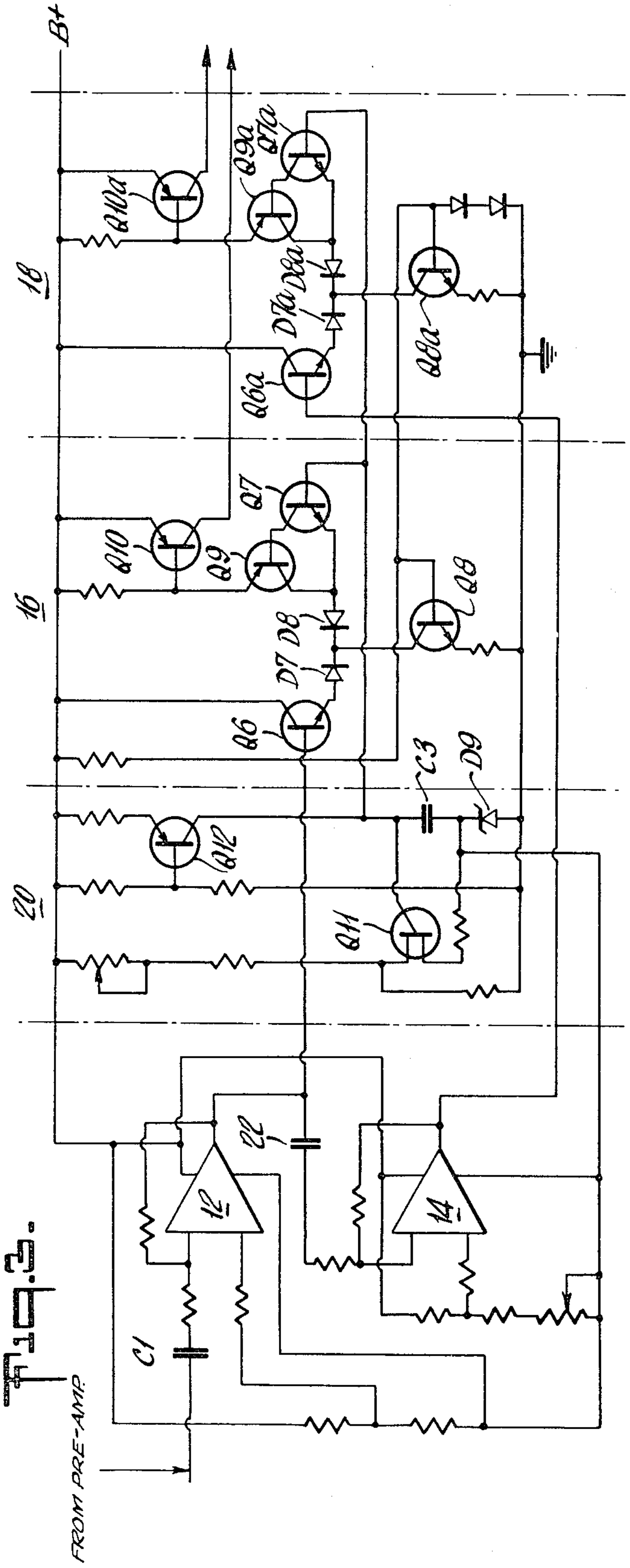
FIG. 3 is a schematic circuit diagram of the balanced modulator and sawtooth generator portion of the circuit of the invention.

A specific embodiment of the balanced pulse-width modulator having a sawtooth reference source 20 is shown in FIG. 3.

The input signal from preamplifier 10 is applied through a capacitor C1 to the input of operational amplifier 12 which has appropriate input and feedback resistors to produce a unity-gain, 180° phase inversion between its input and output signals. The output of amplifier 12 is applied through a capacitor C2 to the signal input of operational amplifier 14 which is also provided with suitable input and feedback resistors to produce the desired unity-gain and 180° phase inversion.

The output of amplifier 12 is directly coupled to the base of a transistor Q6 which is one section of Schmitt trigger 16. The other section of trigger 16 comprises transistor Q7 which receives the sawtooth signal from generator 20 at its base. The emitters of transistors Q6–Q7 are connected to one another through oppositely poled diodes D7–D8. The junction point between these diodes is connected to the collector of a transistor Q8, the emitter of which is biased so that transistor Q8 serves as constant-current sink in a manner similar to that of transistors Q5–Q5a in bridge 22.

The base and collector of a transistor Q9 are connected to the collector and the emitter of transistor Q7. The emitter of transistor Q9 is connected to an output transistor Q10. Schmitt trigger 16 is a regenerative bistable device comparing the relative magnitudes of the levels of the signals at the bases of transistor Q6 (the input audio signal), and transistor Q7 (the reference sawtooth signal) to produce a pulse signal varying between a high, i.e., B+ level, and ground.

The relative width of the output pulses is determined by the relative amplitude of the input audio signal, as described above with reference to FIGS. 4$a$ and 4$b$. That pulse signal is operatively connected through transistors Q9–Q10 and produces, at the collector of the latter, one of the pulse-width-modulated control signals which control the operation of the switching transistors in bridge 22. Transistors Q10–Q10$a$ and their associated resistors will be seen to correspond to transistors Q1–Q1$a$ and resistors R4–R5 of FIG. 2.

The output of amplifier 14 is applied to the base of transistor Q6$a$, and the sawtooth signal is connected to the base of transistor Q7$a$; these transistors define the two sections of Schmitt trigger 18, which is effective to produce the second pulse-width-modulated control signal at the collector of transistor 10$a$. Since the circuit design of trigger 18 is substantially identical to that of trigger 16, all components in trigger 18 corresponding to those in trigger 16 are given corresponding reference characters with the subscript $a$ being affixed thereto.

Sawtooth generator 20 comprises a unijunction transistor Q11, which is periodically triggered into conduction when the voltage at its emitter exceeds a critical value to discharge a capacitor C3. The charging path for that capacitor includes a resistor R10. A transistor Q12, having its emitter-collector connected in series between resistor R10 and capacitor C3, improves the linearity of the sawtooth by maintaining a substantially constant charging current for capacitor C3. A Zener diode D9 maintains a constant voltage at base-one of transistor Q11, which, along with the voltage at base-two of that transistor, determines the level of the triggering voltage for transistor Q11. The parameters of the charging circuit of sawtooth generator 20 are selected such that the frequency of the sawtooth signal is sufficiently high, and the midpoint of the sawtooth waveform is at the level of the output signals of amplifiers 12 and 14 for a zero input audio signal.

The circuit of the present invention thus provides an improved high-efficiency audio-frequency amplifier in which a pair of pulse-width-modulated signals derived from an input audio signal control the operation of switching transistors connected in the arms of an output bridge. When the audio signal input is zero, the bridge is balanced by the pulse-width-modulated control signals so that no current flows through the output loudspeaker connected across one diagonal of the bridge. As a consequence, circuit losses are decreased and circuit efficiency is significantly increased.

In addition, operation of the main switching transistors of the bridge is controlled to produce an increase in the rate at which they are switched between their conducting and nonconducting states. This further decreases circuit losses by reducing the period during which both switching transistors in each arm of the bridge are simultaneously conducting.

The audio signal amplification circuit of the present invention is thus capable of operating at higher efficiencies and with a reduced current drain on the power supply, than has heretofore been realizable in comparable circuits.

While only a single embodiment of the present invention has been herein specifically disclosed, it will be appreciated that many variations may be made thereto without departing from the scope of the invention as defined in the claims.

What is claimed is:

1. A signal circuit for supplying an amplified input audio signal to an output transducer, said circuit comprising an input terminal, means operatively connected to said input terminal for producing from said input audio signal first and second phase-displaced signals, means coupled to said phase-displaced signal producing means for producing first and second control pulse signals having pulse widths respectively corresponding to the relative amplitudes of said first and second phase-displaced signals, output means including a balanced bridge coupled to said control-signal-producing means and having first, second, third and fourth arms, a pair of junction points being defined between said first and second arms and said third and fourth arms respectively, for the connection of said transducer therebetween, first, second, third and fourth switching means each having a control terminal connected in said first, second, third and fourth arms respectively, means for applying said first and second control signals to the control terminals of said first and third switching means respectively, and means for respectively coupling said second and fourth switching means to said first and third switching means for respectively rendering said second and fourth switching means unconductive when said first and third switching means are rendered conductive in response to said first and second control signals respectively, and for rendering said second and fourth switching means conductive when said first and third switching means are rendered nonconductive in response to said first and second control signals respectively, whereby an output signal proportional to said input audio signal is developed across said junction points.

2. The circuit of claim 1, further comprising first and second constant-current means operatively connected to the control terminals of said first and second switching means and said third and fourth switching means respectively, for increasing the rate at which said first, second, third and fourth switching means change between their respective conductive and nonconductive states.

3. The circuit of claim 2, in which said first, second, third and fourth switching means respectively comprise first, second, third and fourth semiconductor devices each comprising one of said control terminals and an output circuit, said output circuits of said first and second semiconductor devices and of said third and fourth semiconductor devices being respectively connected to one another at said junction points, said constant-current means comprising fifth and sixth semiconductor devices each having an output circuit operatively connected to the control terminals of said first, second, third and fourth semiconductor devices respectively, and further comprising means for establishing a substantially constant-bias potential at the control terminal of said fifth and sixth semiconductor devices.

4. The circuit of claim 3, in which said first, second, third and fourth semiconductor devices are all of one conductivity type, said bridge further comprising seventh, eighth, ninth and tenth semiconductor devices of an opposite conductivity type than said first, second, third and fourth semiconductor devices and having output circuits operatively connected to the control terminals of said first, second, third and fourth semiconductor devices respectively, and defining means for controlling the conductivity states of said first, second, third and fourth semiconductor devices respectively.

5. The circuit of claim 4, in which the output circuit of said fifth and sixth semiconductor devices are in operative circuit relation with the output circuits of said seventh and ninth semiconductor devices and with the input circuits of said eighth and tenth semiconductor devices.

* * * * *